Feb. 8, 1927.
A. C. KOLLMAN
1,617,160
DIRIGIBLE HEADLIGHT
Filed Dec. 13, 1923
2 Sheets-Sheet 2
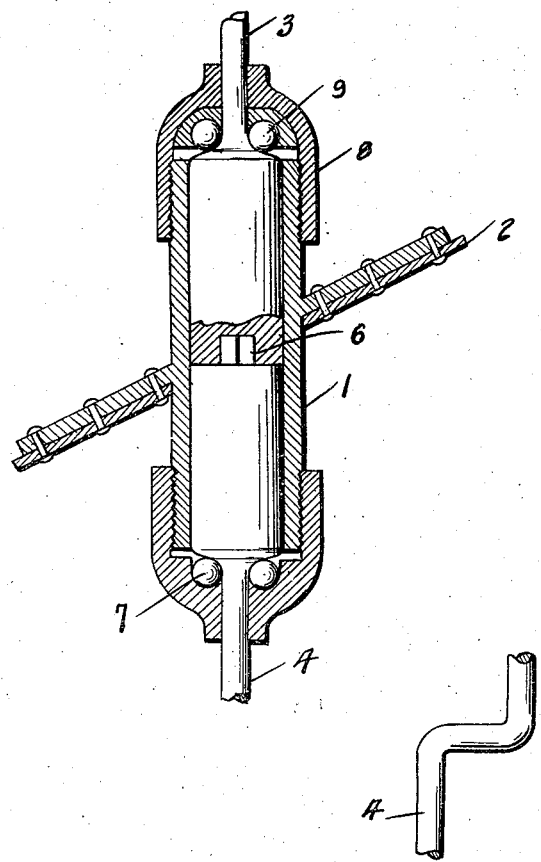
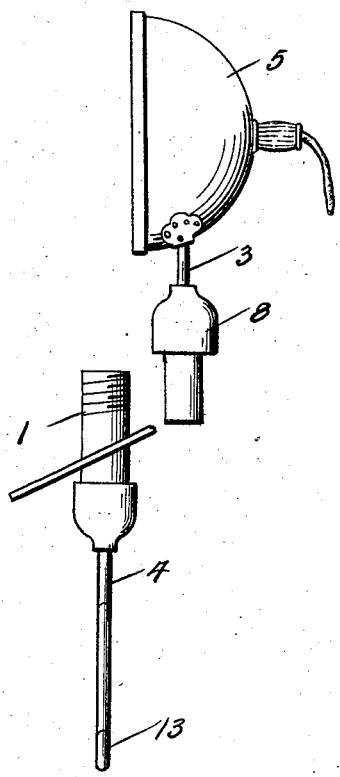
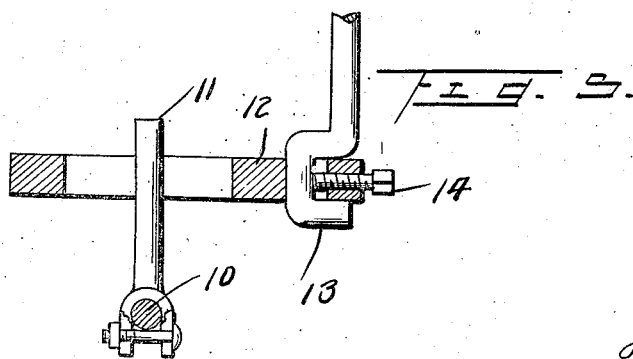
Inventor
A. C. Kollman, Patented Feb. 8, 1927.

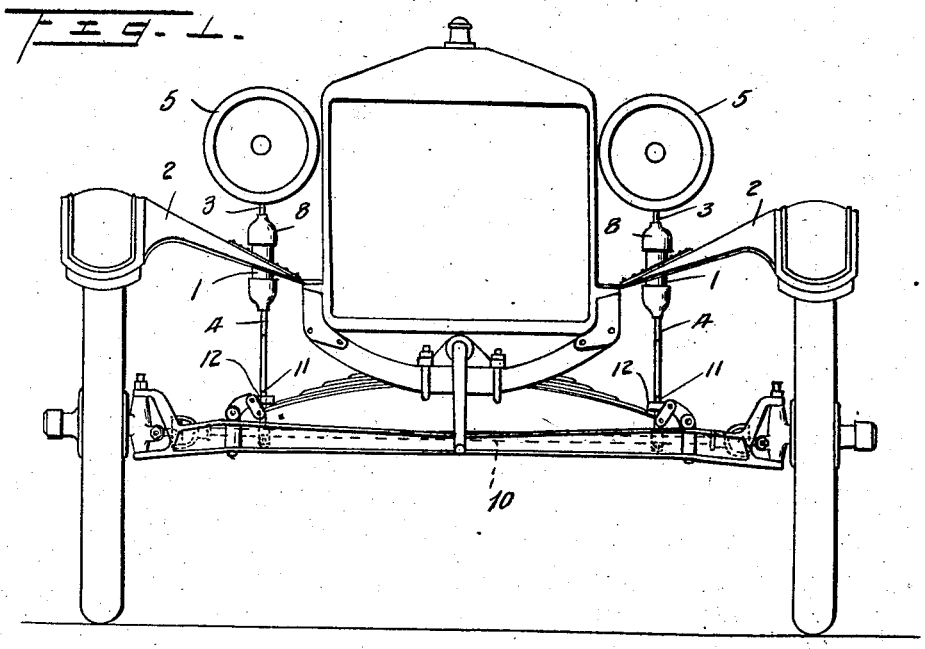
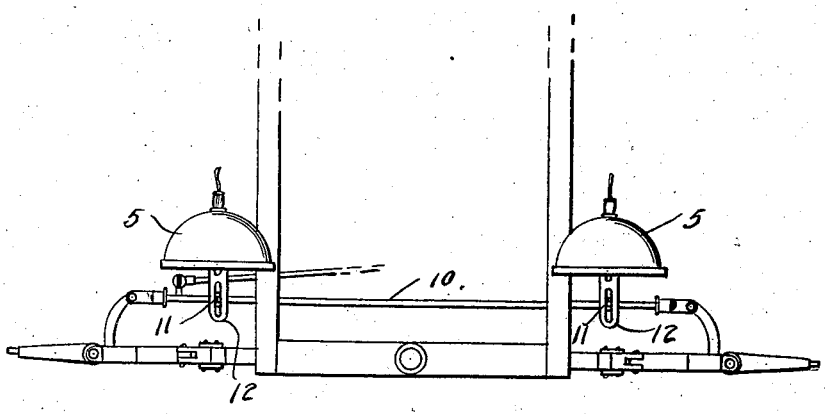

1,617,160

UNITED STATES PATENT OFFICE.

AMOS C. KOLLMAN, OF SAN ANTONIO, TEXAS, ASSIGNOR OF ONE-HALF TO HENRY KENIMER, OF SAN ANTONIO, TEXAS.

DIRIGIBLE HEADLIGHT.

Application filed December 13, 1923. Serial No. 680,497.

This invention relates to headlights and more particularly to such as are designed for motor vehicles and has for its object to pivotally mount the lamps and connect them with the steering mechanism so as to turn with the wheels and thereby illuminate the roadway ahead of the vehicle whether the latter is traveling in a straight course or making a turn either to the right or to the left.

A further purpose of the invention is to construct and mount the headlights so that either may be used as a spotlight or trouble lamp, the construction being such as to admit of the lamp being readily detached from the vehicle when required for use as a trouble lamp or spotlight and easily and quickly replaced after serving as a spotlight or trouble lamp.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a front view of a vehicle provided with headlights embodying the invention, Figure 2 is a fragmentary plan view, Figure 3 is an enlarged sectional view showing more clearly the lamp bearing, the sectional lamp post and the ball bearings, Figure 4 is a detail view of a lamp detached and adapted for use as a spotlight or trouble lamp, and Figure 5 is a detail view of the connection between the lamp post and drag link or connecting rod between the steering knuckle arms.

Corresponding and like parts are referred to in the following description and designated in the several views of the drawings by like reference characters.

In accordance with the present invention, a vertically disposed bearing sleeve 1 is attached to each of the fenders 2 of an automobile or other motor vehicle and receives the lamp post which is of sectional formation comprising an upper section 3 and a lower section 4. It is to be understood that the bearings 1 may be of any preferred construction and attached to any convenient part of the vehicle. The lamp 5 is attached to the upper end of the section 3 and the latter is detachably fitted in the bearing 1 and has a tongue and groove connection 6 with the section 4 whereby to cause both sections of the lamp post to turn together. The lower section 4, while mounted to turn in the bearing 1, is held therein against vertical movement and ball bearings 7 are provided to reduce the friction to the smallest amount possible. The upper section 3 is mounted to turn in the bearing 1 and is readily detachable therefrom to admit of the light being used as a trouble lamp or spotlight. A cap 8 serves to hold the section 3 to the part 1 and ball bearings 9 are provided to reduce the friction to the smallest amount possible.

The drag link or rod 10 connecting the arms of the steering knuckles is provided at opposite ends with pins 11 which are clamped or otherwise secured thereto. Longitudinally slotted arms 12 secured to the lower ends of the sections 4 of the lamp post coact with the respective pins 11, the latter passing through the slots of the arms 12. In this manner provision is had for horizontal movement of the headlights and for the change in the position of the connecting rod 10 due to steering. As shown, the lower end of each of the sections 4 approximates the form of a hook 13 which engages an opening in the end of the arm 12 and is retained in place by means of a set screw 14. It is to be understood that the arms 12 may be attached to the lamp post in any preferred way.

From the foregoing it will be understood that the headlights are pivotally mounted and have connection with the steering mechanism and turn with the steering wheels, thereby throwing the light upon the roadway to illuminate the same whether the vehicle is traveling straight ahead or making a turn either to the right or to the left. It is observed furthermore that either of the headlights may be readily detached and used as a trouble lamp or spot light.

What is claimed is:

A mounting for a dirigible headlight comprising a bearing sleeve having means to secure it to a fender whereby it will extend above and below the fender, caps threaded on the ends of said sleeve, a lamp post formed in two sections and extending through said cap and having their adjacent ends similarly enlarged within the sleeve and peripheral bearing contact throughout their length with the bore wall of the sleeve, the meeting ends of said enlarged portion having inter-engaging means admitting of removal of the headlight and the adjacent end of the lamp post from the sleeve and restoration thereof without disturbing the relative rotative relationship of the two sections of the lamp post, said caps serving to normally maintain the said sections coupled.

In testimony whereof I affix my signature.

AMOS C. KOLLMAN.